United States Patent
Doy et al.

(10) Patent No.: US 12,299,616 B2
(45) Date of Patent: May 13, 2025

(54) REMOTE MANAGEMENT OF MACHINE BASED ON DIFFERENT MACHINE TASK PROGRESS

(71) Applicant: Caterpillar Paving Products Inc., Brooklyn Park, MN (US)

(72) Inventors: Nathaniel S Doy, Maple Grove, MN (US); Gautham Subramanian, Pallikaranai (IN)

(73) Assignee: Caterpillar Paving Products Inc., Brooklyn Park, MN (US)

( * ) Notice: Subject to any disclaimer, the term of this patent is extended or adjusted under 35 U.S.C. 154(b) by 289 days.

(21) Appl. No.: 17/858,760

(22) Filed: Jul. 6, 2022

(65) Prior Publication Data
US 2024/0013117 A1    Jan. 11, 2024

(51) Int. Cl.
*G06Q 10/0631*    (2023.01)
(52) U.S. Cl.
CPC . *G06Q 10/06316* (2013.01); *G06Q 10/06313* (2013.01)
(58) Field of Classification Search
CPC ................................................ G06Q 10/06316
See application file for complete search history.

(56) References Cited

U.S. PATENT DOCUMENTS

| | | | |
|---|---|---|---|
| 10,860,016 B1 | 12/2020 | Wang et al. | |
| 10,872,302 B2 | 12/2020 | Selvaraj et al. | |
| 2006/0129691 A1* | 6/2006 | Coffee | H04L 67/04 709/230 |
| 2008/0291918 A1* | 11/2008 | Turcot | H04Q 3/0087 370/395.3 |
| 2010/0145865 A1* | 6/2010 | Berger | G06Q 10/08 340/572.1 |
| 2016/0163126 A1 | 6/2016 | Divelbiss et al. | |
| 2016/0300175 A1* | 10/2016 | Talmaki | G06Q 10/06315 |
| 2017/0200306 A1 | 7/2017 | Marsolek | |
| 2018/0357583 A1* | 12/2018 | Guillemette | G06F 13/4282 |
| 2019/0260210 A1* | 8/2019 | Peloquin, Jr. | B60K 25/00 |

(Continued)

OTHER PUBLICATIONS

Dadhich, Siddharth, Ulf Bodin, and Ulf Andersson. "Key challenges in automation of earth-moving machines." Automation in construction 68 (2016): 212-222. (Year: 2016).*

(Continued)

*Primary Examiner* — Andre D Boyce

(57) ABSTRACT

A worksite controller can manage machines, including a first machine configured to perform a first task and a second machine configured to perform a second task that follows the first task. The worksite controller can predict a time that the first machine will complete the first task at a work area. The worksite controller can also predict a time the second machine would arrive at the work area to perform the second task. Based on a comparison of the time the second machine would arrive at the work area and the predicted first task completion time, the worksite controller can instruct the second machine to enter or exit a low-power state. For example, if the second machine would arrive at the work area earlier than the predicted first task completion time, the worksite controller can instruct the second machine to avoid idling while waiting by entering the low-power state.

20 Claims, 5 Drawing Sheets

(56) References Cited

U.S. PATENT DOCUMENTS

2021/0148086 A1* 5/2021 Ready-Campbell .... E02F 3/439
2021/0279661 A1 9/2021 Subramanian et al.

OTHER PUBLICATIONS

Mahamedi, Elham, et al. "Automating excavator productivity measurement using deep learning." Proceedings of the Institution of Civil Engineers-Smart Infrastructure and Construction 174.4 (2022): 121-133. (Year: 2022).*

* cited by examiner

REMOTE MANAGEMENT OF MACHINE BASED ON DIFFERENT MACHINE TASK PROGRESS

TECHNICAL FIELD

The present disclosure relates to fleet management associated with a worksite and, more particularly, to managing and reducing idling time of machines at the worksite.

BACKGROUND

Work at a worksite can involve different vehicles performing successive tasks at the same locations. For example, a grading machine may grade a work surface at a worksite area. After the grading machine completes the grading of the work surface at that worksite area, a separate compacting machine may compact the graded work surface.

However, in some situations, assigning different machines to perform successive tasks at the same worksite area can lead to one machine idling until another machine has finished a first task at the worksite area and the machine is clear to begin a second task at the worksite area. For example, if a grading machine and a compacting machine are both assigned to perform tasks at the same worksite area, the compacting machine may not be able to begin a compacting task at the worksite area until the grading machine completes a grading task at the worksite area. If the compacting machine arrives at the worksite area before the grading machine has finished grading the worksite area, the compacting machine may idle with an engine running until the grading machine has finished grading the worksite area and the compacting machine is clear to move into the worksite area to begin the compacting task. By idling for a period of time until the grading machine has completed a grading task, the compacting machine will consume fuel and/or decrease a battery state of charge (SoC).

Various systems have been developed to determine when to shut down machine engines to prevent idling and/or reduce fuel consumption of machines in various circumstances. For example, U.S. Patent Application Pub. No. 2016/0163126 to Divelbiss et al. (hereinafter "Divelbiss") describes an asset management device (AMD) at a machine that can turn the ignition of the machine on or off, and can communicate with central server. The AMD and/or the central server described by Divelbiss can monitor fuel levels, idle times, and other metrics associated with the machine, and determine when to turn off the ignition of the machine. However, although the systems described by Divelbiss may determine when to turn an ignition of a machine off or on based on metrics that are specific to the machine itself, Divelbiss does not determine when to turn an ignition of a machine off or on based on information tasks assigned to other machines. Accordingly, the systems described by Divelbiss may cause a machine to continue to idle for a period of time, even if another machine is currently working in a worksite area and the idling machine will not be able to begin work at that worksite area during the period of time.

The example systems and methods described herein are directed toward overcoming one or more of the deficiencies described above.

SUMMARY OF THE INVENTION

According to a first aspect, a system includes a first machine, a second machine, and a worksite controller. The first machine is configured to perform a first task, and the second machine is configured to perform a second task following completion of the first task by the first machine. The worksite controller is configured to receive, from the first machine, first machine progress data indicating progress associated with the first task at a work area. The worksite controller is also configured to predict, based on the first machine progress data, a completion time of the first task at the work area. The worksite controller is further configured to predict a time the second machine would arrive at the work area to perform the second task. The worksite controller is also configured to send second machine command data to the second machine. The second machine command data instructs the second machine to either enter a low-power state based on the time the second machine would arrive at the work area being earlier than the completion time of the first task, or enter an active state based on the time the second machine would arrive at the work area being equal to or later than the completion time of the first task.

According to a further aspect, a worksite controller includes one or more processors and memory storing computer-executable instructions. The computer-executable instructions, when executed by the one or more processors, cause the one or more processors to perform operations. The operations include receiving, from a first machine, first machine progress data indicating progress associated with a first task at a work area. The operations also include determining to assign a second machine to perform a second task at the work area. The second task is to be performed following completion of the first task at the work area. The operations further include predicting, based on the first machine progress data, a completion time of the first task at the work area. The operations additionally include predicting a time the second machine would arrive at the work area. The operations also include sending second machine command data to the second machine. The second machine command data instructs the second machine to either enter a low-power state based on the time the second machine would arrive at the work area being earlier than the completion time of the first task, or enter an active state based on the time the second machine would arrive at the work area being equal to or later than the completion time of the first task.

According to another aspect, a computer-implemented method includes receiving, by one or more processors, and from a first machine at a worksite, first machine progress data indicating progress associated with a first task at a work area at the worksite. The computer-implemented method also includes determining, by the one or more processors, to assign a second machine to perform a second task at the work area, wherein the second task is to be performed following completion of the first task at the work area. The computer-implemented method additionally includes predicting, by the one or more processors, and based on the first machine progress data, a completion time of the first task at the work area. The computer-implemented method further includes predicting, by the one or more processors, a time the second machine would arrive at the work area. The computer-implemented method also includes sending, by the one or more processors, and based at least in part a comparison of the time the second machine would arrive at the work area and the completion time of the first task, second machine command data to the second machine. The second machine command data causes the second machine to transition between an active state and a low-power state that avoids idling of an engine of the second machine.

BRIEF DESCRIPTION OF THE DRAWINGS

The detailed description is described with reference to the accompanying figures. In the figures, the left-most digit of a reference number identifies the figure in which the reference number first appears. The same reference numbers in different figures indicate similar or identical items.

DETAILED DESCRIPTION

Figure 1:
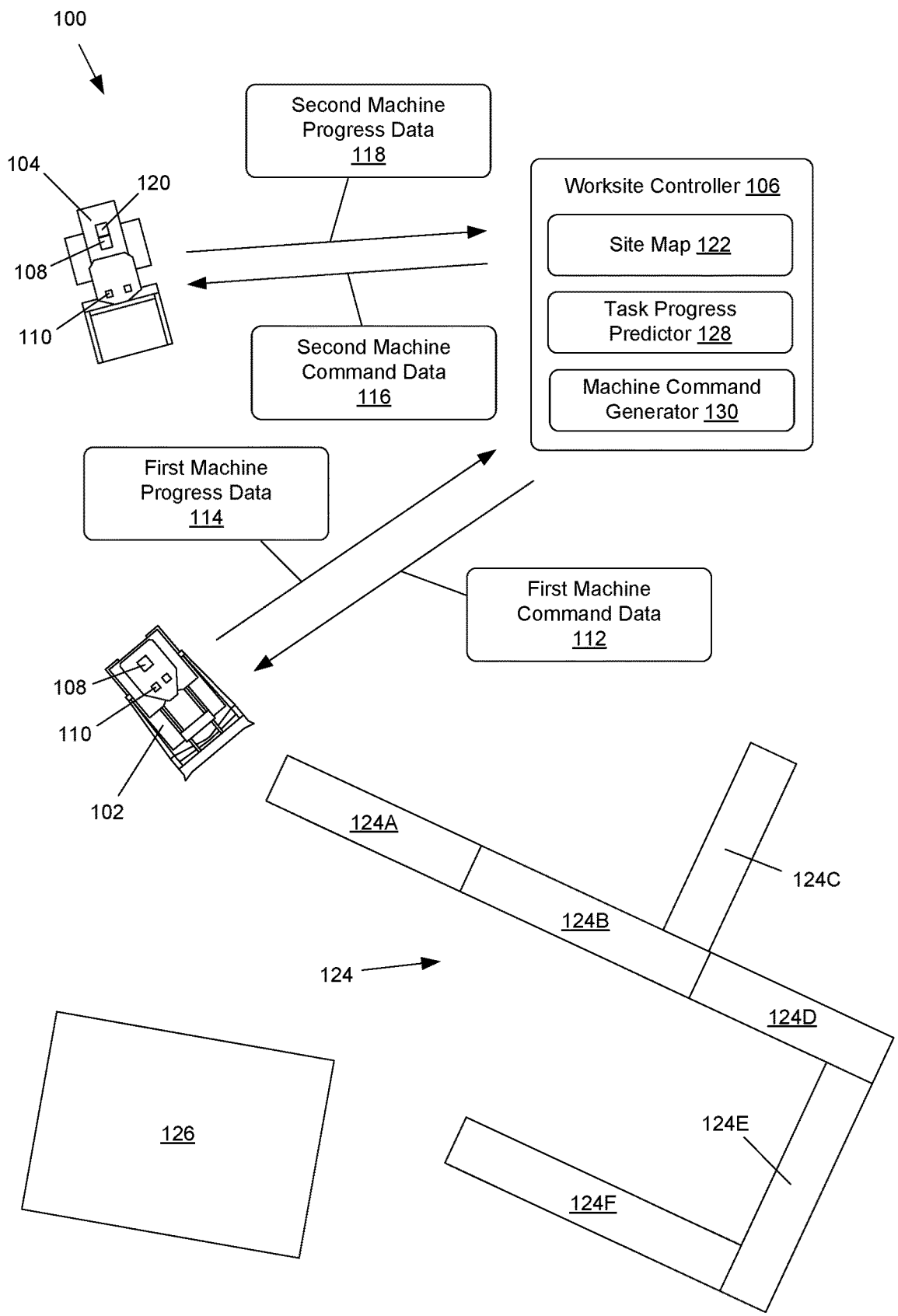
FIG. 1 shows an example of a worksite at which multiple machines perform tasks.

FIG. 1 shows an example of a worksite 100 at which multiple machines perform tasks. Work at the worksite 100 may involve tasks that are to be performed at the same location at different times by different machines. For instance, a first machine 102 can perform a first task at a location at the worksite 100, and a second machine 104 can then perform a second task at the same location at the worksite 100 after the first machine 102 has completed the first task at that location. As an example, the first machine 102 can be a grading machine, such as a motor grader or dozer, that can perform operations to grade an area of the worksite 100. The second machine 104 can be a compacting machine that can perform operations to compact the area of the worksite 100 after the grading machine has finished grading the area. The first machine 102 and/or the second machine 104 can be at least partially autonomous, and can automatically perform tasks at the worksite 100 based on instructions from a worksite controller 106. The worksite controller 106 can be configured to control the second machine 104 in part by instructing the second machine 104 to enter a low-power state, or to wake from a low-power state, based on information about the first machine 102.

For example, if the worksite controller 106 determines that the first machine 102 will be engaged in performing a first task at a particular location at the worksite 100 for a period of time, such that the second machine 104 cannot yet begin a different second task at that particular location, the worksite controller 106 may instruct the second machine 104 to turn off an engine or to enter a low-power state, to avoid idling of the second machine 104 until the first machine 102 has completed the first task. As another example, if the worksite controller 106 predicts that the first machine 102 will complete a first task at a particular location at a future time, the worksite controller 106 can determine an earlier time to instruct the second machine 104 to wake from the low-power state and travel to the particular location, such that the second machine 104 can arrive at the particular location and begin performing the second task at or around the future time the worksite controller 106 predicts the first machine 102 will complete the first task. Accordingly, the second machine 104 can be a low-power state, and avoid idling, until the worksite controller 106 instructs the second machine 104 to begin warming up and traveling to the particular location.

The worksite 100 can be a mine site, a quarry, a construction site, or any other type of worksite or work environment. Multiple types of machines can be present at the worksite 100, such as grading machines, compacting machines, excavation machines, loading machines, hauling machines, and/or other types of machines. The first machine 102 and the second machine 104 can be different machines, and/or different types of machines, at the worksite 100. The first machine 102 can be configured and/or assigned to perform a first task at a location at the worksite 100, while the second machine 104 can be configured and/or assigned to perform a second task that follows the first task at the same location at the worksite 100. After the first machine 102 completes an instance of the first task at a particular location, the second machine 104 can begin an instance of the second task at the particular location and the first machine 102 may move to a different location to begin performing another instance of the first task at the different location.

As discussed above, in some examples the first machine 102 can be a grading machine, and the second machine 104 can be a compacting machine. A grading machine can be configured to create a substantially flat surface by grading material, such as soil, at the worksite 100. The grading machine can, for example, be a scraper, bulldozer, motor grader, or other type of grading machine. The grading machine can be assigned by the worksite controller to perform grading tasks to prepare a work surface of the worksite 100 for subsequent operations, such as a compacting task performed by a compacting machine. The compacting machine can be configured to apply stress on the work surface of the worksite 100 and cause densification of soil, concrete, asphalt, and/or other materials thereon, and/or to obtain an acceptable surface finish. The compacting machine can, for example, be a double drum compacting machine that has a front drum and a back drum that serve to propel the compacting machine and compact material via the weight of the compacting machine, and/or via drum vibrating apparatuses. In other examples, the compacting machine can be a single drum compacting machine, a wheeled or tracked compactor, a vibratory compactor, a tandem vibratory compactor, or any other type of compacting machine. In some examples, the compacting machine can perform a compacting task by performing one or more passes across the work surface of the worksite 100.

As described herein, in some examples the compaction machine can perform second tasks on the work surface of the worksite 100 after the grading machine performs first tasks to grade the work surface. However, in other examples, the first machine 102 can be a compacting machine and the second machine 104 can be a grading machine, such that a second task performed by the grading machine at an area of the worksite 100 follows a first task performed at that area by the compacting machine.

In still other examples, the first machine 102 and/or the second machine 104 may be other types of machines that can perform successive tasks at the same location at the worksite 100. For instance, the first machine 102 can be a haul truck that is assigned to perform a first task to deliver material to a location at the worksite, while the second machine 104 can be a grading machine or compacting machine that is assigned to perform a second task to grade or compact the material at the location after the haul truck has delivered the material to the location.

Machines at the worksite 100, such as the first machine 102 and the second machine 104, are vehicles or other mobile machines that have engines, motors, drivetrains, braking systems, hydraulic components, and/or other mechanisms that can cause movement of wheels of the machines, movement of work tools and/or other elements of the machines, and/or otherwise implement operations of the machines. In some examples, one or more of the machines, such as the first machine 102 and/or the second machine 104, can be fuel-powered machines that operate based on power provided by internal combustion engines and/or other elements that consume fuel. In other examples, one or more of the machines, such as the first machine 102 and/or the second machine 104, can be battery electric machines (BEMs), battery electric vehicles (BEVs), hybrid vehicles, fuel cell and battery hybrid vehicles, or other mobile machines. For instance, the first machine 102 and/or the second machine 104 can have batteries, such as lithium-ion (Li-ion) batteries, lithium-ion polymer batteries, nickel-metal hydride (NiMH) batteries, lead-acid batteries, nickel cadmium (Ni—Cd) batteries, zinc-air batteries, sodium-nickel chloride batteries, or other types of batteries that can at least partially power the first machine 102 and/or the second machine 104.

At least some of the machines at the worksite 100, such as the first machine 102 and/or the second machine 104, can be semi-autonomous machines or fully autonomous machines that can operate automatically based on instructions from the worksite controller 106. For example, functions of a machine, such as steering, speed adjustments, work tool movements, and/or other functions, can be fully or partially controlled, automatically or semi-automatically, by on-board and/or off-board controllers or other computing devices associated with the machine. As an example, a machine, such as the first machine 102 and/or the second machine 104, can have an electronic control module (ECM) 108 and/or other on-board computing devices that can fully or partially control operations of the machine. The machine can, for instance, have an on-board guidance system that can drive the machine autonomously, an obstacle detection system that assists the on-board guidance system or can alert a human operator of nearby objects detected by the obstacle detection system, and/or other systems that fully or partially control operations of the machine. As another example, the worksite controller 106 or another off-board computing device can receive data from a machine and return instructions to the machine to dispatch the machine to autonomously travel along a defined and/or assigned route, or to fully or partially control operations of the machine remotely.

Machines at the worksite 100, such as the first machine 102 and/or the second machine 104, can also include sensors 110, such as cameras, LIDAR sensors, RADAR sensors, other optical sensors or perception systems, Global Positioning System (GPS) sensors, other location and/or positioning sensors, work tool position sensors, hydraulic pressure sensors, payload sensors, speed sensors, brake temperature sensors, other temperature sensors, tire pressure sensors, battery state of health (SoH) sensors, fuel sensors, incline and decline travel sensors, and/or other types of sensors. Such sensors 110 of a machine can be operable coupled to the ECM 108 and/or other on-board computing systems. The sensors 110 can also provide corresponding sensor data to the ECM 108 and/or other on-board computing systems, and/or off-board computing systems such as the worksite controller 106, such that the sensor data can be used to determine a location of the machine, detect nearby terrain, detect nearby objects, such as vehicles, other machines, or personnel, detect the positions of such nearby objects relative to the machine, determine a weight of a payload carried by the machine, determine a state of charge (SoC) of a battery system, determine an amount of fuel carried by the machine, and/or perform other operations. In some examples, data provided by sensors 110 of a machine can enable the ECM of the machine to cause the machine to drive and/or operate autonomously or semi-autonomously.

As discussed above, the first machine 102 and/or the second machine 104 can operate autonomously or semi-autonomously based on instructions provided by the worksite controller 106. The first machine 102 and the second machine 104 can have wireless communication interfaces that are operably coupled to the ECMs of the machines, and that allow the ECMs of the machines to send data to, and receive instructions or other data from, the worksite controller 106. Such wireless communication interfaces can include cellular interfaces, modems, receivers, transmitters, antennas, and/or other hardware or software elements configured to send and receive data, for instance to exchange data with the worksite controller 106.

The worksite controller 106 can have, or be associated with, similar wireless communication interfaces, such that the worksite controller 106 can wirelessly exchange data with the ECMs and/or other on-board computing systems of the first machine 102 and the second machine 104. For example, the worksite controller 106 can send first machine command data 112 to the first machine 102, and can receive first machine progress data 114 from the first machine 102. The worksite controller 106 can similarly send second machine command data 116 to the second machine 104, and can receive second machine progress data 118 from the second machine 104.

The first machine command data 112 sent by the worksite controller 106 can include instructions that can be executed by the ECM 108 and/or other on-board computing devices of the first machine 102 to cause the first machine 102 to autonomously perform instances of a first task at particular locations at the worksite 100, and/or that remotely control the first machine 102 during travel and/or performance of instances of the first task. In some examples, the first machine 102 can operate autonomously based on the first machine command data 112, for instance by autonomously driving to the particular location and autonomously performing an instance of the first task at the particular location. In other examples, the worksite controller 106 can continuously or frequently send first machine command data 112 to the first machine 102, such that the worksite controller 106 remotely controls the first machine 102 based on instructions determined automatically by the worksite controller 106 and/or based on input of a human operator provided to the worksite controller 106.

In some examples, the first machine command data 112 can include a design file or other information indicating a location, parameters, and/or or goals associated with an instance of a first task to be performed by the first machine 102. For instance, if the first machine 102 is a grading machine, the first machine command data 112 can assign the first machine 102 to grade the work surface of a particular area of the worksite 100 to a particular elevation defined in the first machine command data 112. Based on the first machine command data 112, the grading machine may autonomously travel to the particular area indicated in the first machine command data 112, and autonomously perform grading operations until the work surface has been graded to the elevation defined in the first machine command data 112.

The ECM 108 and/or other computing elements of the first machine 102 can periodically or occasionally send first machine progress data 114 to the worksite controller 106. The first machine progress data 114 can indicate a location of the first machine 102 at the worksite 100, for instance based on GPS coordinates or other positioning data determined by the first machine 102. The first machine progress data 114 can also include sensor data determined by sensors 110 of the first machine 102, such as work tool positions, hydraulic pressures, fuel levels, battery SoC levels, and/or other types of sensor data. In some examples, the first machine progress data 114 can also indicate progress information associated with an assigned instance of a first task, such as an estimated task completion percentage and/or an estimated time remaining to complete the assigned instance of the first task.

The second machine command data 116 sent by the worksite controller 106 to the second machine 104 can be similar to the first machine command data 112 the worksite controller 106 sends to the first machine 102. For example, the second machine command data 116 can include instructions that can be executed by the ECM 108 and/or other computing elements of the second machine 104 to cause the second machine 104 to autonomously perform instances of a second task at particular locations at the worksite 100, and/or that remotely control the second machine 104 during travel and/or performance of instances of the second task.

The second machine progress data 118 sent by the ECM 108 and/or other computing elements of the second machine 104 to the worksite controller 106 can be similar to the first machine progress data 114 the first machine 102 sends to the worksite controller 106. For example, the ECM 108 and/or other computing elements of the second machine 104 can periodically or occasionally send second machine progress data 118 to the worksite controller 106 that includes GPS coordinates or other data indicating a location of the second machine 104 at the worksite 100, sensor data determined by sensors 110 of the second machine 104, progress information associated with an instance of a second task assigned to the second machine 104, and/or other data.

In some situations, the second machine command data 116 sent by the worksite controller 106 to the second machine 104 can also include a shut-down command or a wake-up command. As will be described further below, the worksite controller 106 can be configured to send shut-down commands or wake-up commands to the second machine 104 based at least in part on first machine progress data 114 received by the worksite controller 106 from the first machine 102.

The second machine 104 can be configured to enter a low-power state if second machine command data 116 received from the worksite controller 106 includes a shut-down command. The low-power state can include turning off an engine and/or other components of the second machine 104, such that the second machine 104 can avoid idling while in the low-power state. In some examples, the low-power state can be a total shutdown of the second machine 104, aside from components that may remain powered and/or active to listen for a wake-up command. In other examples, the low-power state can be another state in which at least some components of the second machine 104 shut down, hibernate, other otherwise reduce energy consumption levels. Accordingly, while in the low-power state, the second machine 104 can reduce fuel consumption or battery discharge rates, or avoid using fuel and/or main machine batteries altogether. The second machine 104 can also be configured to wake from the low-power state, to an active state, if second machine command data 116 received from the worksite controller 106 includes a wake-up command.

The second machine 104 can include a power state manager 120 that is connected to electrical and/or mechanical components of the second machine 104, and is configured to change the state of the second machine 104 between a low-power state and an active state in response wake-up commands or shut-down commands in second machine command data 116 received from the worksite controller 106. For example, the power state manager 120 can be configured to turn off an engine and/or other components of the second machine 104 in response to a shut-down command, and turn on the engine and/or other components of the second machine 104 in response to a wake-up command.

The power state manager 120 can be a computing device, a software element, or a hardware element that is part of, or is connected to or associated with, wireless communication elements of the second machine 104. For example, the power state manager 120 may be an element of the ECM 108 of the second machine 104, or a separate element that is operably connected to the ECM 108 of the second machine 104. The power state manager 120 and corresponding wireless communication elements can be configured to operate on battery power or other reserve power while some or all of the rest of the second machine 104 is in a low-power state, such that the power state manager 120 can listen for second machine command data 116 that includes a wake-up command. If the power state manager 120 detects second machine command data 116 that includes a wake-up command, the power state manager 120 can wake the ECM 108 and/or wake other components of the second machine 104. Accordingly, although the rest of the second machine 104 may be in a low-power state, the power state manager 120 can receive a wake-up command from the worksite controller 106, and can cause the second machine 104 to move from the low-power state to an active state.

In some examples, the second machine 104 may take a period of time to fully wake from a low-power state to an active state. For instance, in response to a wake-up command, the power state manager 120 can turn on an engine of the second machine 104, activate hydraulic and/or mechanical components of the second machine 104, turn on sensors 110 of the second machine 104, and/or perform other operations to wake the second machine 104 to an active state at which the second machine 104 is ready to begin traveling and/or performing other operations. Activation and/or warm-up of such components in response to the wake-up command may take time, such as seconds or minutes, before the second machine 104 becomes ready for use. For instance, sensors 110, such as GPS sensors, positioning sensors that enable the second machine 104 to drive autonomously, and/or work tool positioning sensors may take seconds or minutes to turn on or calibrate.

The worksite controller 106 can be configured to send wake-up commands to the second machine 104 at times that the worksite controller 106 determines based on projected times that the first machine 102 will complete assigned tasks, projected times for the second machine 104 to wake from a low-power state to an active state, projected travel times for the second machine 104 to travel to locations at the worksite 100, and/or other data. The worksite controller 106 can also be configured to send shut-down commands to the second machine 104 when the worksite controller 106 determines that the second machine 104 is likely to not be engaged in performing tasks for a period of time, and can avoid idling and wasting fuel or battery charge by entering a low-power state.

Figure 5:
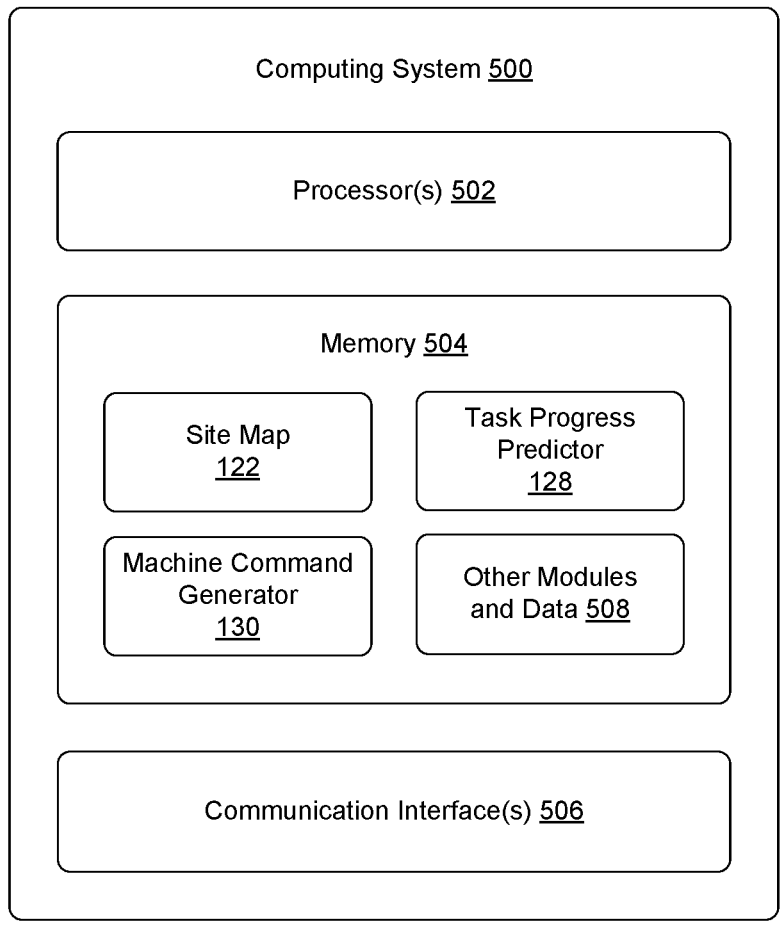
FIG. 5 shows an example system architecture for a computing system associated with the worksite controller.

The worksite controller 106 can be one or more servers, computers, or other off-board computing devices that are separate from the first machine 102 and the second machine 104. For example, while the first machine 102 and the second machine 104 can be located at the worksite 100, the worksite controller 106 can be located at a back office or other location that is remote from first machine 102 and the second machine 104 at the worksite 100, or that is remote from the worksite 100 overall. The worksite controller 106 can be configured to track machines at the worksite 100, assign machines to perform tasks at the worksite 100, transmit instructions and/or commands to machines at the worksite 100, and/or to perform fleet management operations and other operations associated with the worksite 100. FIG. 5, discussed further below, describes an example system architecture for a computing system associated with the worksite controller 106.

The worksite controller 106 can have a site map 122 associated with the worksite 100. The site map 122 can indicate locations of work areas 124 at the worksite 100, boundaries of the worksite 100, terrain of the worksite 100, locations and/or identities of machines at the worksite 100, locations of a parking area 126 at the worksite 100, locations and/or identities of obstacles at the worksite 100, and/or other information associated with the worksite 100. For example, the site map 122 can indicate locations of refueling stations, battery recharging stations, vehicles, personnel, lakes, ponds, rivers, cliff faces, hills, roads, intersections, and/or other types of areas, objects, terrain features, or obstacles.

As noted above, the site map 122 can indicate work areas 124 at the worksite 100 where machines, such as the first machine 102 and the second machine 104, are to perform tasks. For example, the site map 122 can indicate locations and/or boundaries of individual work areas 124 at the worksite 100, such as work areas 124 where tasks are to be performed during a particular workday or other period of time. FIG. 1 shows an example in which the work areas 124 include work areas 124A-124F, however the site map 122 may indicate fewer work areas 124, more work areas 124, different locations and/or configurations of work areas 124, and/or a set of work areas 124 with any other differing attributes.

The site map 122 can also include, or be associated with, design information indicating a desired state of the worksite 100 and/or individual work areas 124. For example, the design information can indicate defined elevations that the work surface of the worksite 100 should be graded to, by grading machines, at one or more work areas 124. In some examples, the worksite controller 106 can have a user interface that allows a user to define one or more work areas 124 at the worksite 100, provide design information associated with the work areas 124, define tasks to be performed by machines at the work areas 124, and/or other information.

In some examples, the worksite controller 106 can update the site map 122 over time based on first machine progress data 114 received from the first machine 102, second machine progress data 118 received from the second machine 104, and/or other machine progress data received from other machines. For instance, the worksite controller 106 can use progress data received from machines to update the site map 122 to track current locations of machines, and/or to update a model of the current state of the work surface of the worksite based on tasks that machines have completed.

The worksite controller 106 can also have a task progress predictor 128 that can use progress data, such as the first machine progress data 114 and the second machine progress data 118, received from machines to predict, project, or estimate when individual machines will complete particular tasks, and/or will complete portions of particular tasks. In some examples, the progress data received from a machine may include an estimated task completion percentage and/or estimated task completion time determined by an ECM or other on-board computing system of the machine. In these examples, the task progress predictor 128 can use such estimates determined on-board the machines as predicted task completion times. However, in other examples, the progress data received from a machine may include other types of data that the task progress predictor 128 can use to predict an estimated time of completion for a particular task.

As an example, if the first machine 102 is a grading machine, the first machine progress data 114 can indicate a cut-fill map or other data that directly or indirectly indicates a current elevation of a work surface. For instance, the first machine progress data 114 may indicate an elevation of a blade or other grading work tool determined by an elevation sensor or positional sensor of the grading machine, which can allow the worksite controller 106 to determine a corresponding current elevation of the work surface on which the work tool has operated. The first machine progress data 114 may also, or alternately, indicate coordinates of the location of the machine, hydraulic sensor data, work tool positioning data, and/or other data that allows the worksite controller 106 to determine whether the first machine 102 has been performing a cut operation, a fill operation, or other operations associated with an overall grading task, which the task progress predictor 128 may use to estimate a corresponding work surface elevation.

In some examples, the task progress predictor 128 can compare work surface elevations directly or indirectly indicated in multiple instances of first machine progress data 114 received from the grading machine over time, and/or relative to a target work surface elevation indicated in a design file, to project how much longer the overall grading task is projected to take. For example, the task progress predictor 128 can determine a change between a first work surface elevation (indicated at a first time by a first instance of the first machine progress data 114) and a second work surface elevation (indicated at a second time by a second instance of the first machine progress data 114) and determine a progress rate based on the change in the work surface elevations between the first time and the second time. The task progress predictor 128 can then project a task completion time for the overall grading task, based on the progress rate and a depth of material still be graded between the second work surface elevation and a target work surface elevation.

Although the task progress predictor 128 can determine or predict a task completion time for an overall task as described above, in some examples the task progress predictor 128 can also, or alternatively, predict times at which machines will complete portions of task. For example, first machine progress data 114 provided by the first machine 102 may indicate that the first machine 102 will be finished working on a task at a first portion of work area 124A at a first time, and will be finished working on the task at a second portion of work area 124A at a second time.

The task progress predictor 128 can also be configured to predict travel times of machines to locations at the worksite 100, based on current locations of the machines, available routes indicated by the site map 122, terrain conditions indicated by the site map 122, historical average speeds of individual machines, and/or other data. The task progress predictor 128 can also be configured to predict machine wake-up times, such as the time it may take the second machine 104 to wake to an active state from a low-power state in response to a wake-up command from the worksite controller 106, for instance based on historical wake-up times for the same machine or similar machines.

In some examples, the task progress predictor 128 can be configured to predict task progress data, durations of machine operations, and/or other data based on physics-based simulations of machines, the work areas 124, and/or the worksite 100 overall. In other examples, the task progress predictor 128 can include or be based on at least one machine learning model that is configured to predict task progress data, durations of machine operations, and/or other data. For example, the task progress predictor 128 can be based on convolutional neural networks, recurrent neural networks, other types of neural networks, nearest-neighbor algorithms, regression analysis, Gradient Boosted Machines (GBMs), Random Forest algorithms, deep learning algorithms, and/or other types of artificial intelligence or machine learning frameworks.

A machine learning model associated with the task progress predictor 128 can be trained using a supervised or unsupervised machine learning approach, for instance based on a training data set. For example, the training data set can include sample progress data, similar to the first machine progress data 114 and the second machine progress data 118, reported by similar machines during operations of similar tasks, and corresponding data indicating when those machines finished the tasks. The machine learning model can learn to identify which factors in the sample progress data are predictive of the task completion times indicated in the training data set. Accordingly, after training the machine learning model to identify such factors and/or weights associated with the factors, the task progress predictor 128 can, for example, use information associated with those factors in first machine progress data 114 received from the first machine 102 to predict when the first machine 102 is likely to complete an instance of a first task.

In some examples, the task progress predictor 128 can be associated with multiple machines learning models, such as different types of machine learning models machine learning models that have been trained on different training data sets, or machine learning models that have been trained to make predictions for different types of use cases or types of machines. Accordingly, the task progress predictor 128 may select a particular machine learning model to use to predict when the first machine 102 is likely to complete an instance of a first task, based on a type of first machine 102, information in the site map 122, information in the first machine progress data 114, and/or other information that indicates a particular use case or scenario associated with the particular machine learning model.

A machine command generator 130 of the worksite controller 106 can be configured to generate and transmit command data to machines at the worksite 100, such as the first machine command data 112 and the second machine command data 116. The command data sent to a particular machine can assign the machine to perform tasks at one or more work areas 124, instruct the machine to travel to certain work areas 124 autonomously or along specified routes determined by the worksite controller 106, instruct the machine to travel to the parking area 126 at the worksite 100, and/or otherwise include instructions that the ECM 108 and/or other on-board computing systems of the machine can follow. In some examples, the machine command generator 130 can generate and send machine commands that include wake-up commands or shut-down commands, based on predicted task completion times predicted by the task progress predictor 128. As discussed above, a wake-up command can cause a machine to wake from a low-power state to an active state, while a shut-down command can cause the machine to move from an active state to the low-power state.

As an example, the machine command generator 130 can determine, based on the site map 122, that a first task and a second task are to be performed at work area 124A at the worksite 100. The machine command generator 130 can accordingly cause the worksite controller 106 to send first machine command data 112 that instructs the first machine 102 to perform an instance of the first task at work area 124A. In response to the first machine command data 112, the ECM 108 of the first machine 102 can cause the first machine 102 to travel to work area 124A and begin performing the first task. The ECM 108 of the first machine 102 can also periodically or occasionally send first machine progress data 114 to the worksite controller 106. Accordingly, the task progress predictor 128 can use physics simulations, machine learning models, historical data, and/or other operations or data to predict a time at which the first machine 102 will complete the first task at work area 124A. The task progress predictor 128 can also can use physics simulations, machine learning models, historical data, and/or other operations or data to predict a period of time it would take the second machine 104 to wake from a low-power state to an active state and travel to work area 124A. Based on the predicted time of completion of the first task by the first machine 102 at work area 124A, and the predicted period of time for the second machine 104 to wake and travel to work area 124A, the machine command generator 130 can cause the worksite controller 106 to send second machine command data 116 including a wake-up command to the second machine 104. The second machine command data 116 can cause the second machine 104 to wake up from the low-power state and travel to work area 124A at a time such that the second machine 104 arrives at work area 124A to begin performance of the second task at or after the predicted time of completion of the first task by the first machine 102 at work area 124A.

In some examples, the second machine command data 116 can be sent to the second machine 104 prior to the predicted time of completion of the first task at work area 124A by the first machine 102. For example, if the task progress predictor 128 predicts that the first machine 102 will complete the first task at work area 124A at 2:30 pm, and the task progress predictor 128 predicts that it will take the second machine 104 ten minutes to wake from a low-power state and travel to work area 124A, the worksite controller 106 can send second machine command data 116 to the second machine 104 at 2:20 pm. The second machine command data 116 can include a wake-up command and instructions to perform the second task at work area 124A. Accordingly, in response to the second machine command data 116 received at 2:20 pm, the power state manager 120 of the second machine 104 can turn on an engine of the second machine 104 and/or otherwise cause the second machine 104 to wake from the low-power state and begin traveling to work area 124A such that the second machine 104 arrives at work area 124A at or around 2:30 pm, when the first machine 102 was projected to complete the first task at the work area 124A. The second machine 104 can thus begin performance of the second task at work area 124A substantially immediately after the first machine 102 completes the first task at work area 124A and moves to a different work area.

In other examples, the worksite controller 106 can send second machine command data 116 to the second machine 104 at a time that causes the second machine 104 to arrive at a portion of a particular work area at or after a time at which the task progress predictor 128 projects that the first machine 102 will be finished working at that portion of the particular work area, even if the first machine 102 may still be working at other portions of the particular work area. For example, if the task progress predictor 128 predicts that the first machine 102 will be finished with a first half of work area 124D at 4:00 pm, the worksite controller 106 can send second machine command data 116 that causes the second machine 104 to begin work at the first half of work area 124D at or after 4:00 pm, even if the first machine 102 may be working at a second half of work area 124D.

In still other examples, the worksite controller 106 can wait to send the second machine command data 116 to the second machine 104 at a later time, to cause the second machine 104 to arrive at work area 124A after the first machine 102 has completed an instance of the first task at work area 124A. For instance, if the worksite controller 106 assigns the first machine 102 to perform instances of the first task at each of work areas 124A-F, the worksite controller 106 may wait to wake the second machine 104 from a low-power state until the first machine 102 has completed instances of the first task at multiple work areas 124, such that the second machine can perform instances of the second task at multiple work areas 124 successively without returning to the low-power state while the first machine 102 completes work at a later work area. As an example, if the task progress predictor 128 projects that the first machine 102 will take three hours to complete instances of the first task across all of work areas 124A-F, and that second machine 104 will take two hours to perform instances of the second task across all of work areas 124A-E, the worksite controller 106 can delay waking the second machine 104 to perform the second tasks until two hours before the first machine 102 is projected to finish the first task at work area 124F. Accordingly, the second machine 104 can be projected to continuously perform instances of the second task at work areas 124A-E and then enter work area 124F at or after the first machine completes the first task at work area 124F. As such, the worksite controller 106 can lower the risk of the second machine 104 catching up to the first machine 102 and having to idle or enter the low-power state while waiting for the first machine 102 to complete work at a particular work area.

If the task progress predictor 128 does determine, based on first machine progress data 114 and/or second machine progress data 118, that the second machine 104 is likely to have to wait for the first machine 102 to complete work at a work area for a period of time before the second machine 104 can begin work at that work area, the machine command generator 130 may cause the worksite controller 106 to send second machine command data 116 that includes a shut-down command. Accordingly, in response to the shut-down command, the power state manager 120 of the second machine 104 can cause the second machine 104 to enter the low-power state, and thereby reduce or eliminate fuel consumption and/or other energy consumption, rather than the second machine 104 idling until the first machine 102 moves on and the work area is clear for the second machine 104.

Based on a prediction of when the first machine 102 is likely to complete the first task at that work area, or progress data indicating that the first machine 102 has finished the first task at that work area, the worksite controller 106 can send second machine command data 116 that includes a wake-up command and causes the second machine 104 to wake and perform the second task at the work area.

In some situations, the worksite controller 106 may keep the second machine 104 idling and/or in an active state if the first machine 102 is projected to complete work at a work area within a threshold period of time. For example, the second machine 104 may approach or reach work area 124C when the first machine 102 is still performing an instance of the first task at work area 124C. The task progress predictor 128 may predict that the first machine 102 will complete the first task at work area 124C within three minutes. If the task progress predictor 128 predicts that it would take ten minutes for the second machine 104 to enter the low-power state and then wake back up to the active state, the worksite controller 106 may avoid causing the second machine 104 to switch to the low-power state such that the second machine 104 remains activate and ready to begin the second task at work area 124A in three minutes when the first machine 102 is likely to complete the first task at work area 124A. However, if the task progress predictor 128 instead predicts that the first machine 102 will complete the first task at work area 124C in thirty minutes, and it would take ten minutes for the second machine 104 to enter the low-power state and then wake back up to the active state, the worksite controller 106 may cause the second machine 104 to enter the low-power state and stay in the low-power state until closer to, or after, the time at which the first machine 102 is projected to complete the first task at work area 124C.

The machine command generator 130, the task progress predictor 128, and/or other elements of the worksite controller 106 can also be configured to perform fleet management operations associated with a fleet of machines. For example, there may be multiple instances of the first machine 102 and/or the second machine 104 at the worksite 100, such that the worksite controller 106 can select individual machines to assign to perform tasks at work areas 124. The worksite controller 106 can select machines to assign to perform tasks based on machine types, sizes or other parameters of the machines, fuel levels of the machines, battery SoC levels of the machines, locations of the machines relative to work areas 124, and/or other variables. Although in some examples the worksite controller 106 may cause a machine to enter a low-power state instead of idling for a period of time, as discussed above, in other examples the worksite controller 106 may reassign the machine to perform a task at another work area instead of idling or entering the low-power state.

For example, the worksite controller 106 may have assigned a grading machine to grade work area 124A, work area 124B, and work area 124C, and assigned a compacting machine to compact work area 124A, work area 124B, and work area 124C. The compacting machine may finish compacting work area 124B while the grading machine is still grading work area 124C. In some examples, the worksite controller 106 can avoid idling of the compacting machine while the grading machine is still grading work area 124C by instructing the compacting machine to be in a low-power state until the grading machine has completed grading work area 124C. However, in other examples, the worksite controller 106 can avoid idling of the compacting machine while the grading machine is still grading work area 124C by reassigning the compacting machine to compact a different work area. For instance, a separate grading machine may have recently finished grading work area 124F, or may be projected to have finished grading work area 124F by the time the compacting machine would reach work area 124F. Accordingly, the worksite controller 106 may reassign the compacting machine to perform compacting tasks at work area 124F, instead of the compacting machine idling or being in a low-power state until the grading of work area 124C is complete.

As another example of fleet management operations, the worksite controller 106 can instruct machines to return to the parking area 126. For example, if the worksite controller 106 determines that the first machine 102 and/or the second machine 104 have completed assigned tasks at work areas 124 during a work day, or other period of time, or if the end or the work day or other work period will be ending within a threshold period of time, the worksite controller 106 can send machine command data that causes the first machine 102 and/or the second machine 104 to autonomously travel to the parking area 126 and park. As another example, if the worksite controller 106 projects that zero work areas 124 will become clear for the second machine 104 to work at by the end of a work day, based on first machine progress data 114 from one or more first machines working at the work areas 124, the worksite controller 106 can instruct the second machine 104 to travel to the parking area 126 to park instead of waiting near the work areas 124.

In some examples, the worksite controller 106 can also send shut-down commands in the machine command data that cause the first machine 102 and/or the second machine 104 to enter low-power states or fully shut down while parked at the parking area 126. Similar to the second machine 104, the first machine 102 can have a power state manager that can cause the first machine 102 to enter a low-power state, and wake from the low-power state. Accordingly, the machines can enter the low-power state and avoid idling once the machines reach the parking area 126. Before or during the next work day or work period, the worksite controller 106 can send machine command data with wake-up commands that cause the first machine 102 and/or the second machine 104 to wake from the low-power state, and/or assigns the machines to perform tasks at particular work areas 124.

Overall, the worksite controller 106 can use first machine progress data 114 received from the first machine 102 to predict when the first machine 102 is likely to finish instances of a first task at one or more work areas 124. The worksite controller 106 can manage operations of the second machine 104 based on the predicted task completion times associated with the first machine 102. For example, the worksite controller 106 can cause the second machine 104 to enter, or stay in, a low-power state during periods of time when the second machine 104 might otherwise be idling while waiting for the first machine 102 to complete instances of the first task. As another example, the worksite controller 106 can reassign the second machine to perform a second task at other work areas during periods of time when the second machine 104 might otherwise be idling while waiting for the first machine 102 to complete instances of the first task.

Figure 2:
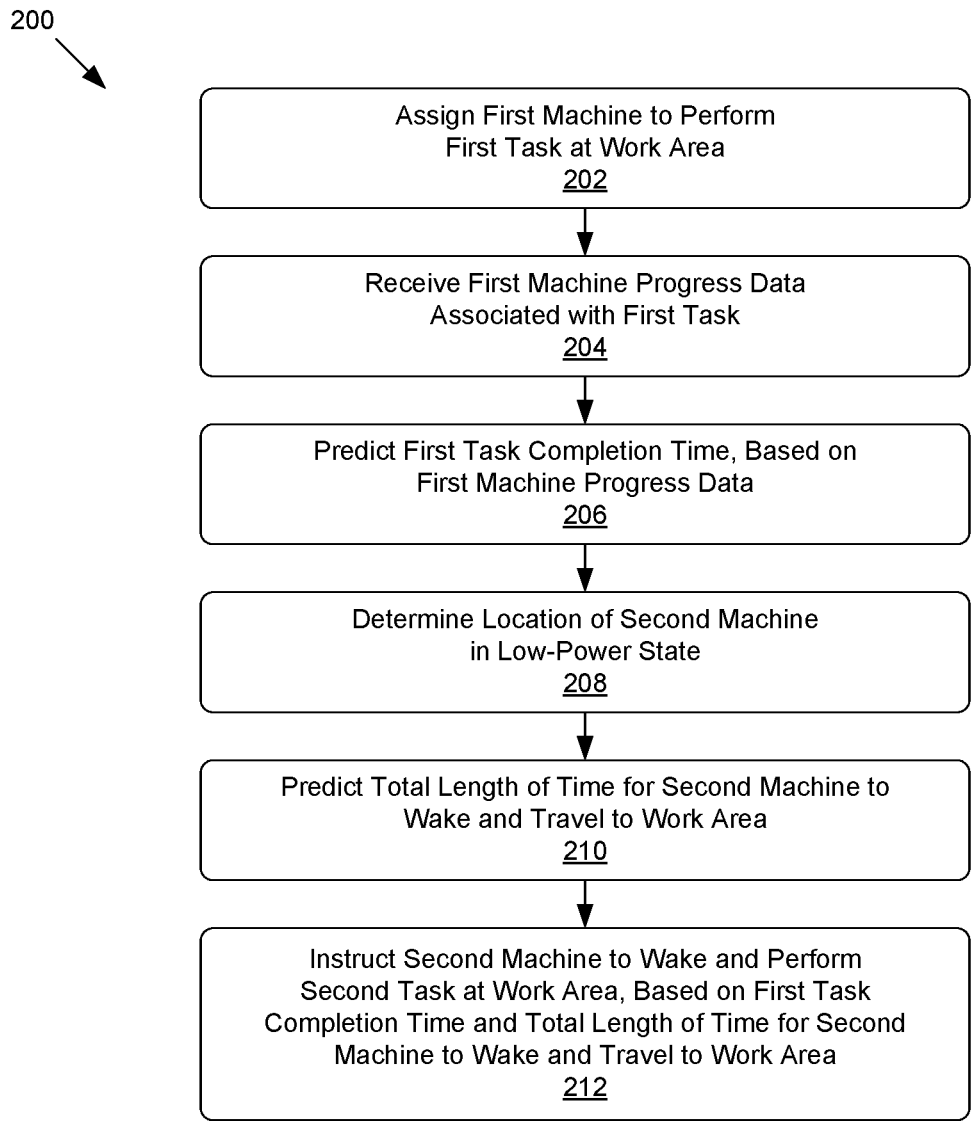
FIG. 2 shows a flowchart illustrating a first example process for managing operations of a second machine at the worksite, based at least in part on first machine progress data from a first machine at the worksite.

FIG. 2 shows a flowchart 200 illustrating a first example process for managing operations of the second machine 104 at the worksite 100, based at least in part on first machine progress data 114 from the first machine 102 at the worksite 100. The operations shown in FIG. 2 can be performed by the worksite controller 106. FIG. 5, discussed further below, describes an example system architecture for a computing system associated with the worksite controller 106.

At block 202, the worksite controller 106 can assign the first machine 102 to perform a first task at a work area at the worksite 100. For example, the site map may indicate that the first task is to be performed at the work area, and the worksite controller 106 can transmit first machine command data 112 the ECM 108 of the first machine 102 that instructs the first machine 102 to travel to the work area and perform the first task. The first machine command data 112 can also indicate design information associated with performance of the first task, such as design information or parameters associated with a target elevation or state of the work surface of the work area following performance of the first task.

At block 204, the worksite controller 106 can receive first machine progress data 114 from the ECM 108 of the first machine 102. The first machine progress data 114 can indicate a location of the first machine 102 at the worksite 100. The first machine progress data 114 can also include information that indicates an estimated completion time of the first task or an estimated completion percentage of the first task determined by the ECM 108 of the first machine 102, and/or information that the worksite controller 106 can use to predict a first task completion time. Accordingly, at block 206 the worksite controller 106 use the information in the first machine progress data 114, and/or multiple instances of the first machine progress data 114 received over a period of time, to predict a first task completion time at which the first machine 102 is likely to complete performance of the first task at the work area.

At block 208, the worksite controller 106 can determine a location of the second machine 104 at the worksite 100. The second machine 104 can be in a low-power state. For example, the second machine 104 can be parked with an engine and/or other components shut off and/or in low-power modes.

At block 210, the worksite controller 106 can predict a total length of time it would take for the second machine 104 to wake from the low-power state and travel to the work area. For example, the worksite controller 106 can predict a length of a wake-up period in which the second machine 104 activates, warms up, and/or calibrates an engine, hydraulic components, sensors 110, and/or other components. The worksite controller 106 can also predict a length of time for the second machine 104 to travel to the work area, for instance based on the current location of the second machine 104, the location of the work area, terrain information and/or information about available routes, speed capabilities of the second machine 104, and/or other variables. The worksite controller 106 can accordingly total the predicted length of the wake-up period and the predicted length of the travel time to predict the total length of time for the second machine 104 to wake from the low-power state and travel to the work area.

At block 212, the worksite controller 106 can instruct the second machine to wake from the low-power state and perform a second task at the work area. For example, the worksite controller 106 can transmit second machine command data 116 that includes a wake-up command that prompts the power state manager 120 to wake the second machine 104, and includes instructions that the ECM 108 of the second machine 104 can use to cause the second machine 104 to travel to the work area and perform the second task. The worksite controller 106 can instruct the second machine to wake from the low-power state at a time selected based on the first task completion time predicted at block 206 and the total length of time for the second machine 104 to wake from the low-power state and travel to the work area predicted at block 210. For instance, the worksite controller 106 can send the second machine command data 116 with the wake-up command at or after a time determined by subtracting the predicted total length of time for the second machine 104 to wake from the low-power state and travel to the work area from the predicted first task completion time. Accordingly, based on the predicted total length of time for the second machine 104 to wake from the low-power state and travel to the work area, the second machine 104 can be projected to arrive at the work area at or after the first task completion time at which the first machine 102 is predicted to complete the first task, and the second machine 104 can begin the second task at the work site without waiting for the first machine 102 to complete the first task.

As an example, the worksite controller 106 may predict at block 206 that the first machine 102 will complete the first task at the work area at 10:00 am. The worksite controller 106 may also predict at block 210 that the second machine 104 will take fifteen minutes to wake from the low-power state and then travel to the work area. Accordingly, the worksite controller 106 may send second machine command data 116, that includes a wake-up command and instructions to perform the second task at the work area, to the second machine at or after 9:45 am. Accordingly, the second machine 104 can take the predicted fifteen minutes to wake and travel to the work area, and arrive at the work area at or after the 10:00 am time at which the first machine 102 was predicted to complete the first task at the work area. The second machine 104 can thus begin the second task substantially immediately after arriving at the work area, without idling while waiting for the first machine 102 to complete the first task at the work area.

As another example, the worksite controller 106 may predict that the first machine 102 will complete an instance of the first task at work area 124A at 10:00 am, and complete an instance of the first task at work area 124B at 10:30 am. In this example, the worksite controller 106 may predict that the second machine 104 would take fifteen minutes to wake from a low-power state and travel to work area 124A, but would complete an instance of the second task at work area 124A at 10:15 am if the second machine 104 arrived at work area 124A at 10:00 am. Accordingly to avoid the second machine 104 idling or returning to the low-power state between 10:15 am and 10:30 (when the first machine 102 is predicted to complete the first task at work area 124B and the second machine 104 could begin the second task at work area 124B), the worksite controller 106 may wait until 10:00 am to send second machine command data 116 with a wake-up command to the second machine 104. The second machine command data 116 can cause the second machine 104 to begin waking at 10:00 am, reach work area 124A at 10:15 am, finish the second task at work area 124A at 10:30 am, and thus be clear to begin the second task in work area 124B at 10:30 am (when the first machine 102 is predicted to complete the first task at work area 124B). If the worksite controller 106 has assigned the first machine 102 to perform the first task in additional work areas 124, the worksite controller 106 may wait to wake or assign the second machine 104 to perform the second task in the work areas 124 based further on predicted times that the first machine 102 will complete the first task in the individual work areas.

Figure 3:
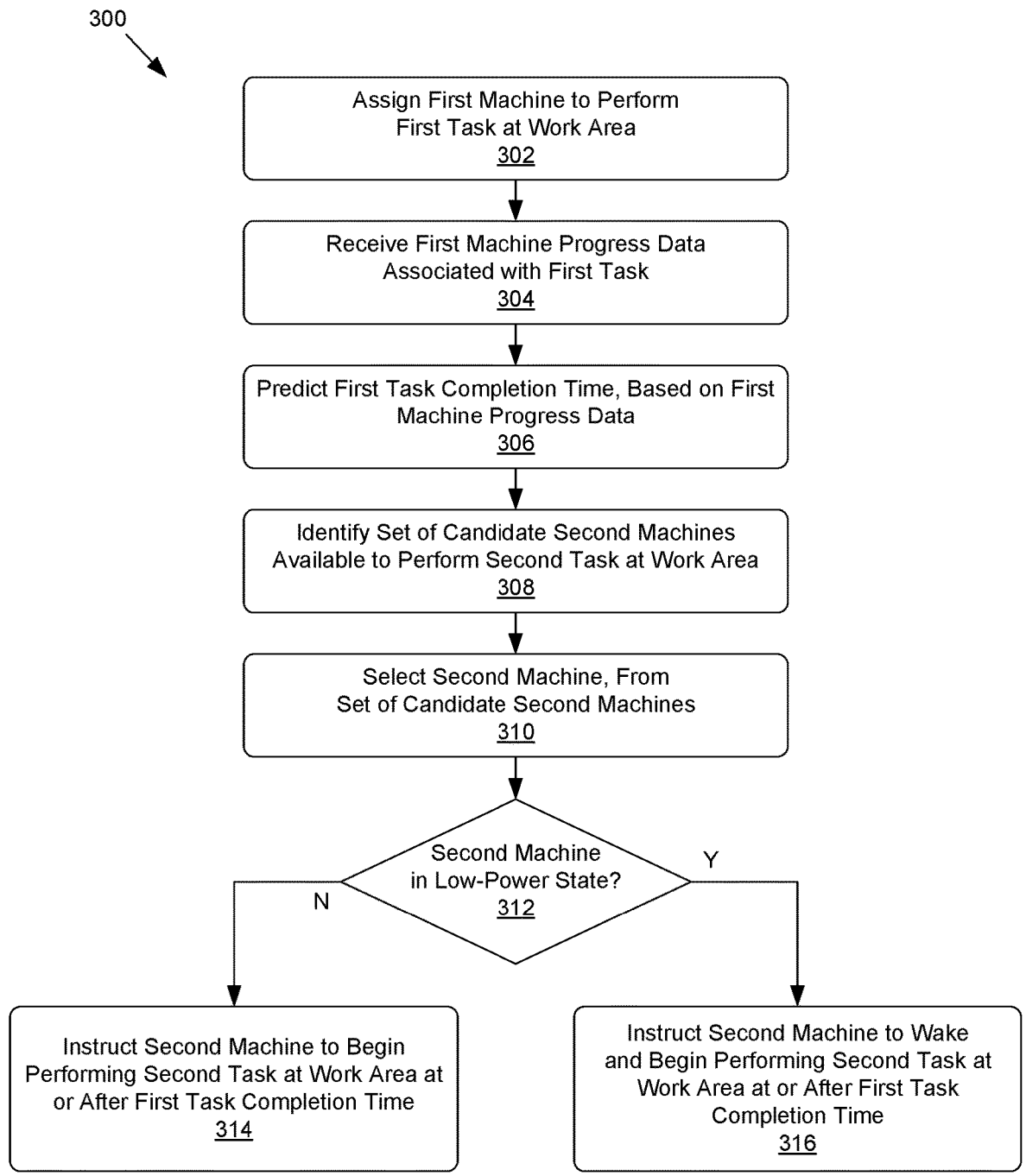
FIG. 3 shows a flowchart illustrating a second example process for managing operations of the second machine at the worksite, based at least in part on first machine progress data from the first machine at the worksite.

Overall, FIG. 2 shows a process in which the second machine 104 is initially in a low-power state, and can be woken by the worksite controller 106 to perform a second task at a work area based at least in part on first machine progress data 114 indicating progress of the first machine 102 on a first task that is to be performed prior to the second task at the work area. However, in other examples the worksite controller 106 may be configured to assign one of multiple instances of the second machine 104 at the worksite 100 to perform the second task, some of which may or may not be in a low-power state. FIG. 3, discussed further below, shows a process by which the worksite controller 106 can select the second machine 104 from a set of candidate second machines, and assign the second machine 104 to perform the second task.

FIG. 3 shows a flowchart 300 illustrating a second example process for managing operations of the second machine 104 at the worksite 100, based at least in part on first machine progress data 114 from the first machine 102 at the worksite 100. The operations shown in FIG. 3 can be performed by the worksite controller 106. FIG. 5, discussed further below, describes an example system architecture for a computing system associated with the worksite controller 106.

At block 302, the worksite controller 106 can assign the first machine 102 to perform a first task at a work area at the worksite 100, as described above with respect to block 202 of FIG. 2. At block 304, the worksite controller 106 can receive first machine progress data 114 from the ECM 108 of the first machine 102, as described above with respect to block 204 of FIG. 2. At block 306 the worksite controller 106 use the information in the first machine progress data 114, and/or multiple instances of the first machine progress data 114 received over a period of time, to predict a first task completion time at which the first machine 102 is likely to complete performance of the first task at the work area, as described above with respect to block 206 of FIG. 2.

At block 308, the worksite controller 106 can identify a set of candidate second machines at the worksite 100 that are available to perform the second task at the work area. For example, if the second machine 104 is a compacting machine, there may be multiple compacting machines at the worksite 100 that are not currently engaged in tasks, or that are predicted to complete assigned tasks before the first task completion time, such the worksite controller 106 could potentially assign any of the available compacting machines to perform the second task at the work area.

At block 310, the worksite controller 106 can select the second machine 104 from the set of candidate second machines identified at block 308. The worksite controller 106 can be configured to consider multiple factors when selecting a particular second machine at block 310, such as locations of the second machines, fuel levels and/or battery SoC levels of the second machines, sizes, weights, or other parameters of the second machines, and/or other factors. The worksite controller 106 may be configured to prioritize different factors, and/or weight different factors or combinations of factors differently when selecting the second machine 104 at block 310. For example, if the second machines are compacting machines, and one compacting machine is currently closer to the work area than another compacting machine, the worksite controller 106 may prioritize selection of the compacting machine that is closer to the work area. As another example, if one compacting machine has more fuel than another compacting machine, the worksite controller 106 may prioritize selection of the compacting machine that has more fuel. For instance, the worksite controller 106 may select a compacting machine that is farther away from the work area than another compacting machine closer to the work area, if the closer compacting machine is low on fuel and should instead be assigned to travel to a refueling station. As yet another example, if one compactor has a larger drum than another compactor, and a larger drum size is more suitable for a compacting task to be performed at the work area based on the dimensions of the work area or corresponding design information, the worksite controller 106 may prioritize selection of the compacting machine that has the larger drum.

At block 312, the worksite controller 106 can determine whether the second machine 104 selected at block 310 is in a low-power state. For instance, the second machine 104 may have recently completed an instance of the second task, or is predicted to complete an instance of the second task before the predicted first task completion time, such that the second machine 104 is currently in the active state instead of the low-power state. In some examples, the worksite controller 106 can maintain records of machine command data sent to machines, such that the worksite controller 106 can use such records to determine whether the second machine 104 was most recently instructed to enter a low-power state or wake from a low-power state. In other examples, the worksite controller 106 can use second machine progress data 118 and/or other data to determine whether the second machine 104 is active and/or has not yet been instructed to enter a low-power state.

If the worksite controller 106 determines that the second machine 104 is not in a low-power state (Block 312—No), the worksite controller 106 can send second machine command data 116 to the second machine 104 at block 314 that causes the ECM 108 of the second machine 104 to cause the second machine 104 to perform the second task at the work area. The second machine command data 116 sent at block 314 can cause the second machine 104 to arrive at the work area and begin the second task at or after the first task completion time predicted at block 306. For example, the worksite controller 106 can predict a length of time it would take the second machine 104 to travel between a current location of the second machine 104 and the work area. The worksite controller 106 can accordingly wait to send the second machine command data 116 until a time at which the predicted length of the travel time would cause the second machine 104 to arrive at the work area at or later than the first task completion time predicted at block 306.

If the worksite controller 106 instead determines that the second machine 104 is in a low-power state (Block 312—Yes), the worksite controller 106 can send second machine command data 116 to the second machine 104 at block 316 that instructs the power state manager 120 to wake the second machine 104 from the low power state and that instructs the ECM 108 of the second machine 104 to cause the second machine 104 to perform the second task at the work area. The second machine command data 116 sent at block 316 can cause the second machine 104 to arrive at the work area and begin the second task at or after the first task completion time predicted at block 306. For example, similar to block 210 and block 214 shown in FIG. 2, the worksite controller 106 can predict a total length of time for the second machine 104 to wake from the low-power state and travel to the work area, and can send the second machine command data 116 at block 316 at a time at which the total length of time for the second machine 104 to wake from the low-power state and travel to the work area would cause the second machine 104 to arrive at the work area at or later than the first task completion time predicted at block 306.

Figure 4:
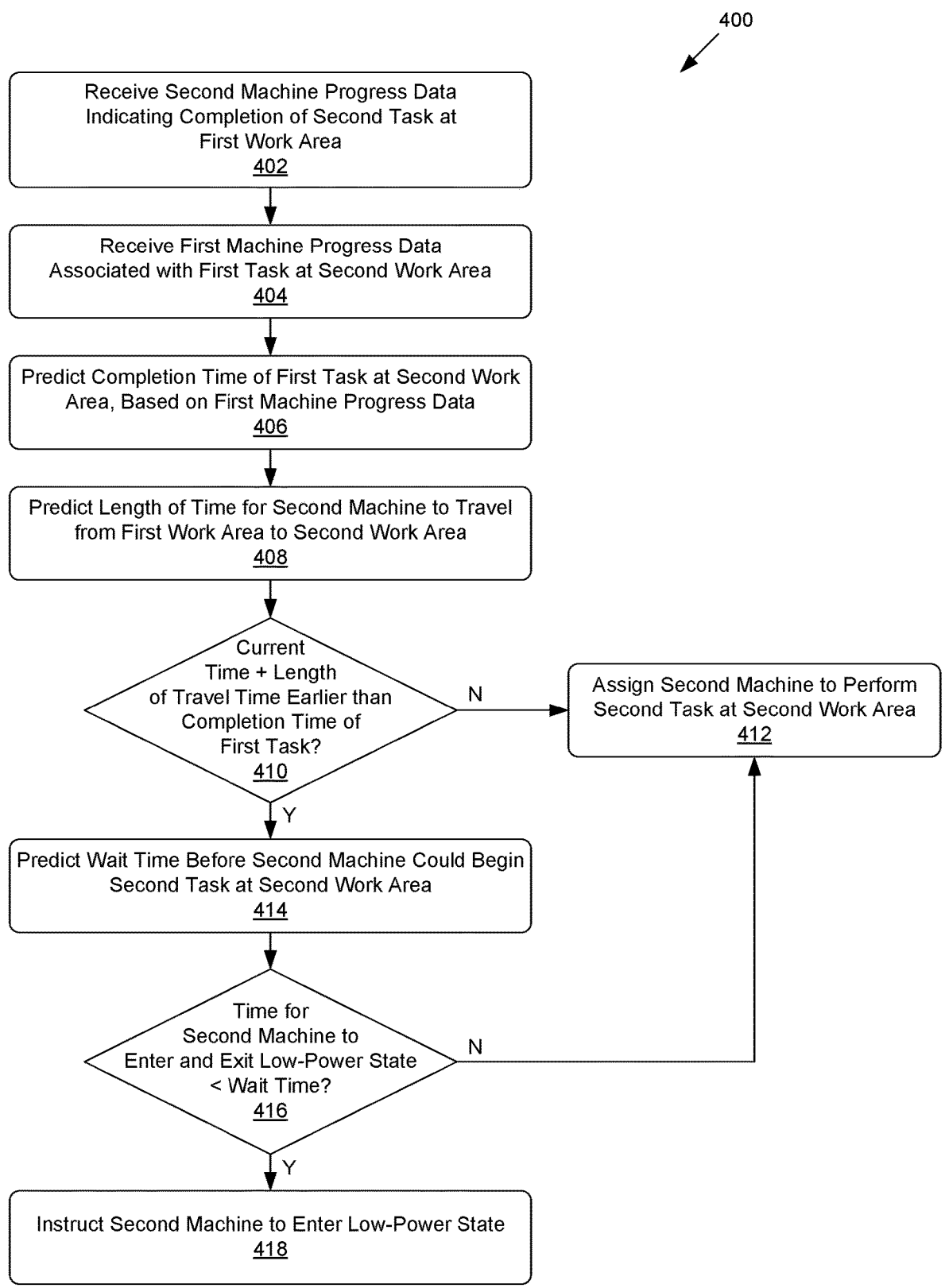
FIG. 4 shows a flowchart illustrating a third example process for managing operations of the second machine at the worksite, based at least in part on first machine progress data from the first machine at the worksite.

Although FIG. 2 and FIG. 3 describe situations in which the worksite controller 106 may wake the second machine 104 from a low-power state, in other situations the worksite controller 106 may instruct the second machine 104 to enter the low-power state if the second machine 104 might otherwise idle in an active state while waiting for the first machine 102 to complete an instance of the first task. FIG. 4, discussed further below, shows an example process by which the worksite controller 106 can determine whether to instruct the second machine 104 to enter the low-power state.

FIG. 4 shows a flowchart 400 illustrating a third example process for managing operations of the second machine 104 at the worksite 100, based at least in part on first machine progress data 114 from the first machine 102 at the worksite 100. The operations shown in FIG. 5 can be performed by the worksite controller 106. FIG. 5, discussed further below, describes an example system architecture for a computing system associated with the worksite controller 106.

At block 404, the worksite controller 106 can receive second machine progress data 118 indicating that the second machine 104 has completed, or will soon complete, an instance of a second task at a first work area. The worksite controller 106 can have previously sent second machine command data 116 that assigned the second machine 104 to perform the instance of the second task at the first work area. For example, the worksite controller 106 can have assigned the second machine 104 to perform the second task at the first work area following completion of a first task at the first work area by the first machine 102. The second machine progress data 118 can accordingly indicate when the second machine 104 completes, or is projected to complete, the second task at the first work area.

At block 404, the worksite controller 106 can receive first machine progress data 114, from the ECM 108 of the first machine 102, associated with an instance of a first task at a second work area. The first machine 102 may previously have completed an instance of the first task at the first work area as described above, and the worksite controller 106 can accordingly have instructed the first machine 102 to move to the second work area to perform another instance of the first task. The first machine progress data 114 received at block 404 can indicate an estimated completion time of the first task at the second work area, an estimated completion percentage of the first task at the second work area, and/or other information that the worksite controller 106 can use to predict a completion time of the first task at the second work area. Accordingly, at block 406 the worksite controller 106 use the information in the first machine progress data 114, and/or multiple instances of the first machine progress data 114 received over a period of time, to predict a completion time at which the first machine 102 is likely to complete performance of the first task at the second work area.

At block 408, the worksite controller 106 can predict a length of time for the second machine 104 to travel from the first work area to the second work area. For example, the worksite controller 106 can use a current location of the second machine 104 at the first work area, the location of the second work area, terrain information and/or information about available routes, speed capabilities of the second machine 104, and/or other variables to predict the length of time it would take for the second machine 104 to travel to the second work area.

At block 410, the worksite controller 106 can determine whether the second machine 104, if instructed to travel to the second work area at the current time and based on the length of the travel time predicted at block 410, would arrive at the second work area before the time the worksite controller 106 predicts that the first machine 102 will complete the first task at the second work area. If the worksite controller 106 predicts that the second machine 104 would not arrive at the second work area before the first machine 102 is predicted to complete the first task at the second work area (Block 410—No), at block 412 the worksite controller 106 can assign the second machine 104 to travel to the second work area and begin an instance of the second task at the second work area. For example, if the worksite controller 106 predicts that the first machine 102 will complete the first task at the second work area at 3:30 pm, and that the second machine 104 would arrive at the second work area at or after 3:30 pm, at block 412 the worksite controller 106 can send second machine command data 116 that instructs the ECM 108 of the second machine 104 to cause the second machine 104 to travel to the second work area and begin an instance of the second task at the second work area.

However, if the worksite controller 106 predicts that the second machine 104 would arrive at the second work area earlier than the first machine 102 is predicted to complete the first task at the second work area (Block 410—Yes), at block 414 the worksite controller 106 can predict how long the second machine 104 would wait at or near the second work area before being able to begin the second task at the second work area. For example, if the worksite controller 106 predicts that the first machine 102 will complete the first task at the second work area at 3:30 pm, but that the second machine 104 would arrive at the second work area at 3:20 pm, the worksite controller 106 can predict at block 414 that the second machine 104 would wait for at least ten minutes before the first machine 102 completes the first task at the second work area and moves to another work area such that the second machine 104 could begin the second task at the second work area.

At block 410, the worksite controller 106 can determine whether a time for the second machine 104 to enter and exit a low-power state is less than the wait time predicted at block 414. If the time for the second machine 104 to enter and exit a low-power state is equal to or above the predicted wait time (Block 416—No), it may be more efficient to directly assign the second machine 104 to perform the second task at the second work area at block 412 even if the second machine 104 would stay in the active state during the predicted wait time. As an example, if the second machine 104 would arrive at the second work site two minutes before the first machine 102 finishes at the second work site, but it would take six minutes for the second machine 104 to transition to the low-power state and then wake again to the active state, the worksite controller 106 may determine that it is more efficient to have the second machine 104 idle and wait for two minutes instead of powering down and then immediately powering back up over a longer period of six minutes.

However, if the time for the second machine 104 to enter and exit a low-power state is less than the predicted wait time (Block 416—Yes), it may be more efficient for the worksite controller 106 to instruct the power state manager 120 of the second machine 104 to cause the second machine 104 to enter the low-power state at block 418. For instance, at block 418 the worksite controller 106 can send second machine command data 116 that includes a shut-down command to the power state manager 120 of the second machine 104. Accordingly, the power state manager 120 can cause the second machine 104 to enter the low-power state while the second machine 104 is still at the first work area, or after the second machine 104 has moved closer to the second work area depending on other instructions from the worksite controller 106, while the first machine 102 is engaged in the first task at the second work area. As an example, if the second machine 104 would arrive at the second work site twenty minutes before the first machine 102 finishes at the second work site, and it would take six minutes for the second machine 104 to transition to the low-power state and then wake again to the active state, the worksite controller 106 may determine that it is more efficient to have the second machine 104 avoid idling for twenty minutes, and thus save fuel and/or battery SoC, while waiting for the first machine 102 by the second machine 104 being in the low-power state for some or all of the predicted twenty-minute wait time.

After the worksite controller 106 instructs the power state manager 120 of the second machine 104 to cause the second machine 104 to enter the low-power state at block 418, the worksite controller 106 can also determine when to instruct the power state manager 120 to wake the second machine 104 to the active state and/or to instruct the ECM 108 of the second machine 104 to cause the second machine 104 to travel to, and/or begin the second task at, the second work area. For example, the worksite controller 106 can use the process described above with respect to FIG. 2 to determine when to instruct the power state manager 120 to wake the second machine 104, based at least in part on a time at which the first machine 102 is predicted to complete the first task at the second work area.

As discussed above, in some examples or situations the worksite controller 106 may determine that it is more efficient to instruct the second machine 104 to enter a low-power state instead of idling while waiting for the first machine 102 to complete work at a particular work area. However, in other examples or situations the worksite controller 106 may alternatively determine that the second machine 104 can avoid idling by performing work at a different work area. For example, rather than instructing the second machine 104 to enter a low-power state while waiting for the first machine 102 to complete an instance of the first task at the second work area at block 418, the worksite controller 106 may determine that the first task has already been performed at a third work area where no other machines are currently working. Accordingly, the worksite controller 106 may assign the second machine 104 to travel to the third work area and perform the second task at the third work area, rather than idling or switching to the low-power state until the first machine completes the first task at the second work area.

FIG. 5 shows an example system architecture for a computing system 500 associated with the worksite controller 106. In some examples, other computing systems, such as the ECM 108 or other on-board computing systems of the first machine 102 and/or the second machine 104, can have architecture that are similar to the system architecture shown in FIG. 5. The computing system 500 can include one or more servers or other computing devices that include one or more processors 502, memory 504, and communication interfaces 506.

The processor(s) 502 can operate to perform a variety of functions as set forth herein. The processor(s) 502 can include one or more chips, microprocessors, application specific integrated circuits (ASICs), field programmable gate arrays (FPGAs) and/or other programmable circuits, central processing units (CPUs), graphics processing units (GPUs), digital signal processors (DSPs), and/or other processing units or components known in the art. In some examples, the processor(s) 502 can have one or more arithmetic logic units (ALUs) that perform arithmetic and logical operations, and/or one or more control units (CUs) that extract instructions and stored content from processor cache memory, and executes such instructions by calling on the ALUs during program execution. The processor(s) 502 can also access content and computer-executable instructions stored in the memory 504, and execute such computer-executable instructions.

The memory 504 can be volatile and/or non-volatile computer-readable media including integrated or removable memory devices including random-access memory (RAM), read-only memory (ROM), flash memory, a hard drive or other disk drives, a memory card, optical storage, magnetic storage, and/or any other computer-readable media. The computer-readable media can be non-transitory computer-readable media. The computer-readable media can be configured to store computer-executable instructions that can be executed by the processor(s) 502 to perform the operations described herein.

For example, the memory 504 can include a drive unit and/or other elements that include machine-readable media. A machine-readable medium can store one or more sets of instructions, such as software or firmware, that embodies any one or more of the methodologies or functions described herein. The instructions can also reside, completely or at least partially, within the processor(s) 502 and/or communication interface(s) 506 during execution thereof by the computing system 500. For example, the processor(s) 502 can possess local memory, which also can store program modules, program data, and/or one or more operating systems.

The memory 504 can store data and/or computer-executable instructions associated with the site map 122, the task progress predictor 128, the machine command generator 130, and/or other elements described herein. The memory 504 can also store other modules and data 508 that can be utilized by the computing system 500 to perform or enable performing any action taken by the computing system 500. For example, the other modules and data 508 can include a platform, operating system, and/or applications, as well as data utilized by the platform, operating system, and/or applications.

The communication interfaces 506 can include transceivers, modems, interfaces, antennas, and/or other components that can transmit and/or receive data over networks or other data connections. In some examples, the communication interfaces 506 can be the wireless communication interfaces that the worksite controller 106 can use to send first machine command data 112 and second machine command data 116, and to receive first machine progress data 114 and second machine progress data 118.

INDUSTRIAL APPLICABILITY

As described above, the worksite controller 106 can use first machine progress data 114 from the first machine 102 to predict when the first machine 102 is likely to complete one or more instances of a first task at one or more work areas 124 at the worksite 100. The worksite controller 106 can also determine second machine command data 116, indicating shut-down commands or wake-up commands, for the second machine 104 based on the predictions of when the first machine 102 is likely to complete the instances of the first task at the work areas 124. Determining the second machine command data 116 for the second machine 104, and managing when the second machine 104 enters and exits a low-power state, based at least in part on the first machine progress data 114 can improve resource management associated with the second machine 104 and/or the worksite 100 overall.

As an example, if the worksite controller 106 predicts that the second machine 104 will have to wait to begin the second task at a work area until the first machine 102 completes the first task at that work area, the worksite controller 106 can instruct the power state manager 120 of the second machine 104 to cause the second machine 104 to enter a low-power state instead of the second machine 104 idling during the predicted wait time. As another example, the worksite controller 106 can instruct the power state manager 120 to wake the second machine 104 from the low-power state at a time at which, due to wake-up operations and/or travel, the second machine 104 is predicted to arrive at a particular work area to perform the second task at or after the first machine 102 is predicted to complete the first task at the particular work area. Accordingly, the second machine 104 can stay in the low-power state and avoid idling until the second machine 104 is likely to be able to wake and perform the second task at a work area without waiting for the first machine 102 to complete the first task.

By being in a low-power state instead of idling with an engine on, for instance during a predicted wait time or until the worksite controller 106 instructs the second machine 104 to wake based on the first machine progress data 114, fuel, battery SoC, and/or other resources of the second machine 104 can be preserved. Preserving fuel and/or battery SoC by being in the low-power state rather than idling may also cause the second machine 104 to refuel and/or recharge less often, such that refueling stations and/or recharging stations at the worksite 100 can be resupplied less often and/or at lower cost. Accordingly, by causing the second machine 104 to enter the low-power state during times at which the second machine 104 might otherwise be waiting for the first machine 102, fuel and/or battery SoC of the second machine 104 and/or the worksite 100 overall can be conserved.

While aspects of the present disclosure have been particularly shown and described with reference to the embodiments above, it will be understood by those skilled in the art that various additional embodiments may be contemplated by the modification of the disclosed machines, systems, and method without departing from the spirit and scope of what is disclosed. Such embodiments should be understood to fall within the scope of the present disclosure as determined based upon the claims and any equivalents thereof.

What is claimed is:

1. A system comprising:
    a first work machine configured to perform a first task at a work area;
    a second work machine configured to:
        operate at least partially autonomously based on machine command data, and
        perform a second task, at the work area, following completion of the first task by the first work machine at the work area; and
    a worksite controller configured to:
        receive, from the first work machine, and via a wireless communication interface, machine progress data indicating progress associated with the first task at the work area;
        predict, based on the machine progress data, a completion time of the first task at the work area;
        predict an arrival time at which the second work machine would arrive at the work area to perform the second task; and
        send the machine command data to the second work machine via the wireless communication interface, the machine command data causing the second work machine to autonomously either:

enter a low-power state based on the arrival time being earlier than the completion time of the first task, or enter an active state based on the arrival time being equal to or later than the completion time of the first task.

2. The system of claim 1, wherein the low-power state avoids idling of an engine of the second work machine.

3. The system of claim 1, wherein:

the arrival time is earlier than the completion time of the first task, the second work machine is in the active state, and the machine command data includes a shut-down command that causes the second work machine to autonomously transition from the active state to the low-power state.

4. The system of claim 1, wherein:

the arrival time is equal to or later than the completion time of the first task, the second work machine is in the low-power state, and the machine command data includes a wake-up command that causes the second work machine to autonomously transition from the low-power state to the active state.

5. The system of claim 1, wherein the worksite controller predicts the arrival time based on one or more of:

a predicted wake-up time for components of the second work machine to wake from the low-power state to the active state, or a predicted travel time for the second work machine to travel from a current location to the work area.

6. The system of claim 1, wherein:

the machine progress data indicates at least one of:

an estimated time remaining to complete the first task, the estimated time remaining having been determined by a processor of the first work machine, an estimated completion percentage of the first task, the estimated completion percentage having been determined by the processor of the first work machine, or sensor data associated with the first task, the sensor data having been measured by sensors of the first work machine, and the worksite controller predicts the completion time of the first task at the work area based on one or more of the estimated time remaining, the estimated completion percentage, or the sensor data.

7. The system of claim 1, wherein:

the first work machine is a grading machine, the second work machine is a compacting machine, the first task is a grading task, and the second task is a compacting task.

8. A worksite controller comprising:

one or more processors; and memory storing computer-executable instructions that, when executed by the one or more processors, cause the one or more processors to perform operations comprising:

receiving, from a first work machine, and via a wireless communication interface, machine progress data indicating progress associated with a first task performed by the first work machine at a work area;

determining to assign a second work machine to perform a second task at the work area, wherein:

the second work machine operates at least partially autonomously based on machine command data provided by the worksite controller, and the second task is to be performed at the work area following completion of the first task by the first work machine at the work area;

predicting, based on the machine progress data, a completion time of the first task at the work area;

predicting an arrival time at which the second work machine would arrive at the work area to perform the second task; and sending the machine command data to the second work machine via the wireless communication interface, the machine command data causing the second work machine to autonomously either:

enter a low-power state based on the arrival time being earlier than the completion time of the first task, or enter an active state based on the arrival time being equal to or later than the completion time of the first task.

9. The worksite controller of claim 8, wherein the operations further comprise selecting the second work machine, from a set of candidate work machines configured to perform the second task, based on at least one of:

a location of the second work machine relative to the work area, a fuel or battery state of charge level of the second work machine, or sizes or weights of components of the second work machine.

10. The worksite controller of claim 8, wherein:

the arrival time is earlier than the completion time of the first task, the second work machine is in the active state, and the machine command data includes a shut-down command that causes the second work machine to autonomously transition from the active state to the low-power state.

11. The worksite controller of claim 8, wherein:

the arrival time is equal to or later than the completion time of the first task, the second work machine is in the low-power state, and the machine command data includes a wake-up command that causes the second work machine to autonomously transition from the low-power state to the active state.

12. The worksite controller of claim 8, wherein the worksite controller predicts the arrival time based on one or more of:

a predicted wake-up time for components of the second work machine to wake from the low-power state to the active state, or a predicted travel time for the second work machine to travel from a current location to the work area.

13. The worksite controller of claim 8, wherein:

the machine progress data indicates at least one of:

an estimated time remaining to complete the first task, the estimated time remaining having been determined by a processor of the first work machine, an estimated completion percentage of the first task, the estimated completion percentage having been determined by the processor of the first work machine, or sensor data associated with the first task, the sensor data having been measured by sensors of the first work machine, and the worksite controller predicts the completion time of the first task at the work area based on one or more of the estimated time remaining, the estimated completion percentage, or the sensor data.

14. The worksite controller of claim 8, wherein:

the first work machine is a grading machine, the second work machine is a compacting machine, the first task is a grading task, and the second task is a compacting task.

15. A computer-implemented method comprising:

receiving, by one or more processors, and from a first work machine at a worksite via a wireless communication interface, machine progress data indicating progress associated with a first task performed by the first work machine at a work area at the worksite;

determining, by the one or more processors, to assign a second work machine to perform a second task at the work area, wherein:

the second work machine operates at least partially autonomously based on machine command data, and the second task is to be performed at the work area following completion of the first task by the first work machine at the work area;

predicting, by the one or more processors, and based on the machine progress data, a completion time of the first task at the work area;

predicting, by the one or more processors, an arrival time at which the second work machine would arrive at the work area to perform the second task; and sending, by the one or more processors, via the wireless communication interface, and based at least in part a comparison of the arrival time and the completion time of the first task, the machine command data to the second work machine, wherein the machine command data causes the second work machine to autonomously transition between:

an active state, and a low-power state that avoids idling of an engine of the second work machine.

16. The computer-implemented method of claim 15, further comprising selecting, by the one or more processors, the second work machine from a set of candidate work machines configured to perform the second task, based on at least one of:

a location of the second work machine relative to the work area, a fuel or battery state of charge level of the second work machine, or sizes or weights of components of the second work machine.

17. The computer-implemented method of claim 15, wherein:

the arrival time is earlier than the completion time of the first task, the second work machine is in the active state, and the machine command data includes a shut-down command that causes the second work machine to autonomously transition from the active state to the low-power state.

18. The computer-implemented method of claim 17, further comprising:

determining, by the one or more processors, a predicted wait time between the arrival time and the completion time of the first task;

determining, by the one or more processors, a minimum period of time for the second work machine to enter the low-power state and return to the active state; and determining, by the one or more processors, that the minimum period of time is less than the predicted wait time, wherein the shut-down command is included in the machine command data based on the minimum period of time being less than the predicted wait time.

19. The computer-implemented method of claim 15, wherein:

the arrival time is equal to or later than the completion time of the first task, the second work machine is in the low-power state, and the machine command data includes a wake-up command that causes the second work machine to autonomously transition from the low-power state to the active state.

20. The computer-implemented method of claim 15, wherein predicting the arrival time is based on one or more of:

a predicted wake-up time for components of the second work machine to wake from the low-power state to the active state, or a predicted travel time for the second work machine to travel from a current location to the work area.

* * * * *